US008123121B2

(12) United States Patent
Thum et al.

(10) Patent No.: US 8,123,121 B2
(45) Date of Patent: Feb. 28, 2012

(54) APPARATUS FOR ACCEPTING AND DISPENSING BANKNOTES

(75) Inventors: Xavier Thum, Wolfratshausen (DE); Ralf Hobmeier, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 565 days.

(21) Appl. No.: 12/323,142

(22) Filed: Nov. 25, 2008

(65) Prior Publication Data

US 2009/0133986 A1 May 28, 2009

Related U.S. Application Data

(60) Provisional application No. 61/091,875, filed on Aug. 26, 2008.

(30) Foreign Application Priority Data

Nov. 27, 2007 (DE) ......................... 10 2007 056 998

(51) Int. Cl.
*G06Q 40/00* (2006.01)

(52) U.S. Cl. ....................................... 235/379; 235/381

(58) Field of Classification Search .................. 235/379, 235/381; 902/30
See application file for complete search history.

(56) References Cited

U.S. PATENT DOCUMENTS 4,571,489 A 2/1986 Watanabe
4,883,183 A 11/1989 Kimura et al.
5,545,882 A * 8/1996 Tanaka ......................... 235/98 R
6,237,739 B1 * 5/2001 Mazur et al. .................. 194/207
6,334,610 B1 1/2002 Minamishin et al.
6,422,458 B1 7/2002 Katou et al.
6,659,340 B2 * 12/2003 Siemens ....................... 235/379
7,497,438 B2 * 3/2009 Stemmle ....................... 271/315
7,533,797 B2 * 5/2009 Stulz et al. ....................... 235/22
7,886,914 B2 * 2/2011 Tanaka et al. ................. 209/534
(Continued)

FOREIGN PATENT DOCUMENTS

DE 100 08 374 A1 8/2001
(Continued)

OTHER PUBLICATIONS

Search Report of German Patent and Trademark Office regarding German Patent Application No. 10 2007 056 998.1, Jun. 18, 2008.

*Primary Examiner* — Ahshik Kim
(74) *Attorney, Agent, or Firm* — Bacon & Thomas PLLC

(57) ABSTRACT

The invention relates to an apparatus for accepting and dispensing or returning bank notes, including a pocket which is dividable by means of a dividing element into two areas for inputting and dispensing or returning bank notes, wherein the dividing element can be moved within the pocket in order to form the two areas, with a clamping element which can be moved within the pocket independently from the dividing element, in order to clamp bank notes disposed in the pocket inside the pocket and to transport them, wherein for clamping bank notes the clamping and transport element is moved in a first direction within the pocket on top of bank notes disposed in the pocket, and transports bank notes to be dispensed or returned out of the area of the dividing element at least for the most part. The dividing element is subsequently moved out of the area of the bank notes disposed in the pocket within the pocket past the clamping and transport element in a second direction that is contrary to the first direction.

7 Claims, 6 Drawing Sheets

U.S. PATENT DOCUMENTS

2007/0000821 A1 1/2007 Nagura

FOREIGN PATENT DOCUMENTS

| | | | |
|---|---|---|---|
| DE | 102 10 689 | A1 | 10/2003 |
| EP | 0 714 078 | A1 | 5/1996 |
| EP | 1 004 098 | B1 | 5/2000 |
| EP | 1 088 965 | A1 | 6/2000 |
| EP | 1008965 | | 6/2000 |
| EP | 1 926 057 | A1 | 5/2008 |

* cited by examiner

APPARATUS FOR ACCEPTING AND DISPENSING BANKNOTES

CROSS REFERENCE TO RELATED APPLICATIONS

The benefit of provisional Application No. 61/091,875 filed on Aug. 26, 2008 is claimed and is incorporated herein by reference.

BACKGROUND

A. Field

The present invention relates to an apparatus for accepting and dispensing or returning bank notes.

Apparatus for accepting and dispensing bank notes are known. The known apparatus are based on the finding that a pocket which is used for inputting bank notes to be accepted is also used for returning bank notes which could not be accepted, e.g. because they could not be recognized or because malfunctions occurred during processing. Furthermore the pocket can be used for paying out bank notes.

From U.S. Pat. No. 4,883,183 such an apparatus is known in which the pocket used for inputting and returning bank notes is divided into two areas by means of a dividing element, wherein one area of the pocket is used for inputting bank notes, whereas the other area is used for returning bank notes. The dividing element simultaneously serves as a rack for the bank notes to be returned.

Since during operation at least the area of the pocket intended for inputting bank notes is closed by a faceplate, it is necessary in the case of an abortion of a deposit procedure to first single all the bank notes and to transport them to the area of the pocket intended for returning the bank notes.

From EP 0 714 078 B1 a further apparatus is known in which the pocket used for inputting and returning bank notes is divided into two areas by a dividing element, wherein one area of the pocket is used for inputting bank notes, whereas the other area is used for returning bank notes. Therein the dividing element can be moved within the pocket, in order to adapt the proportions of the first and the second area to the respective requirements. In addition it is then possible to remove the dividing element from the input pocket, in order to avoid e.g. in the case of an abortion of a deposit procedure the disadvantages described above with reference to U.S. Pat. No. 4,883,183. To ensure a reliable singling of the input bank notes the dividing element is additionally pressed against the bank notes to be singled.

Since the position of the dividing element has to be changed along two axes, the implementation of the known apparatus requires greater space, since the removal of the dividing element in particular requires much space, in order to able to move the dividing element to a position outside the pocket.

From EP 1 004 098 B1 an additional apparatus is known, in which the pocket used for inputting and returning bank notes is divided into two areas by a dividing element, and which corresponds essentially to the above-described EP 0 714 078 81. This means in particular that the dividing element can be moved in two directions. Additionally the dividing element is composed in the shape of a rake and can be divided into two partial elements, each of which completely covers the diameter of the pocket. One of the partial elements is used as a rack for returned bank notes, whereas the other partial element can be pressed against the bank notes to be singled, in order to ensure a secure singling.

Accordingly, also EP 1 004 098 B1 has the problem of the increased required space. Moreover, using a separable dividing element most frequently requires a greater effort, since the two partial elements have to be moved and controlled independently from each other within and outside the pocket.

Moreover, from DE 100 08 374 A1 and DE 10210 689 A1 further apparatus for accepting and dispensing bank notes are known. The apparatus have a dividing element, dividing a pocket into an area for inputting bank notes and an area for dispensing or returning bank notes. In both known apparatus the dividing element remains within the pocket, for which reason problems are encountered in the case of an abortion that are similar to the problems described for U.S. Pat. No. 4,883,183.

BRIEF SUMMARY OF THE INVENTION

It is the object of the present invention to provide an apparatus for accepting and dispensing or returning bank notes, having a pocket for inputting and dispensing or returning bank notes and allowing for a flexible operation during accepting and dispensing or returning bank notes that is comfortable for an operator, wherein the apparatus is to be of a simple and compact structure.

This problem is solved according to the invention by the features of claim 1.

The invention proceeds from an apparatus for accepting and dispensing or returning bank notes, with a pocket which, for inputting and dispensing or returning bank notes, is dividable into two areas by means of a dividing element, wherein the dividing element can be moved within the pocket in order to form the two areas in the pocket, with a clamping and transport element which can be moved within the pocket independently from the dividing element, in order to clamp bank notes disposed in the pocket inside the pocket and transport them, wherein for clamping bank notes the clamping and transport element is moved in a first direction within the pocket on top of bank notes disposed in the pocket and transports bank notes to be dispensed or returned out of the area of the dividing element at least for the most part, and that the dividing element is subsequently moved out of the area of the bank notes disposed in the pocket, within the pocket, past the clamping and transport element, in a second direction that is contrary to the first direction.

The advantage of the invention is in particular that a flexible and compact structure of the apparatus for accepting and dispensing or returning bank notes is rendered possible in that both the dividing element and the clamping and transport element are disposed inside the pocket and are moved exclusively within the pocket, in order to divide the pocket into the two areas required for accepting and dispensing or returning bank notes. For this purpose it is made sure during inputting or returning bank notes that the bank notes are transported out of the area of the dividing element by means of the clamping and transport element. The dividing element can then be returned to an initial position within the pocket without any problem. Consequently only movements of the dividing element and also the clamping and transport element within the pocket are required, for which reason the apparatus for accepting and dispensing or returning bank notes can be designed in a particularly compact fashion.

However, in particular all bank notes disposed in the pocket can be dispensed or returned at any given time, even if the acceptance of bank notes is aborted, in which case both the bank notes to be accepted and the bank notes to be returned can be removed by an operator in one action and with one single grip of the hand, since the dividing element and the clamping element are moved exclusively within the pocket and along only one axis also in this case.

DESCRIPTION OF THE DRAWINGS

Further advantages of the present invention will result from the dependent claims as well as the following description of embodiments with reference to figures.

The figures are described as follows.

DETAILED DESCRIPTION OF PREFERRED EMBODIMENTS OF THE INVENTION

Figure 1:
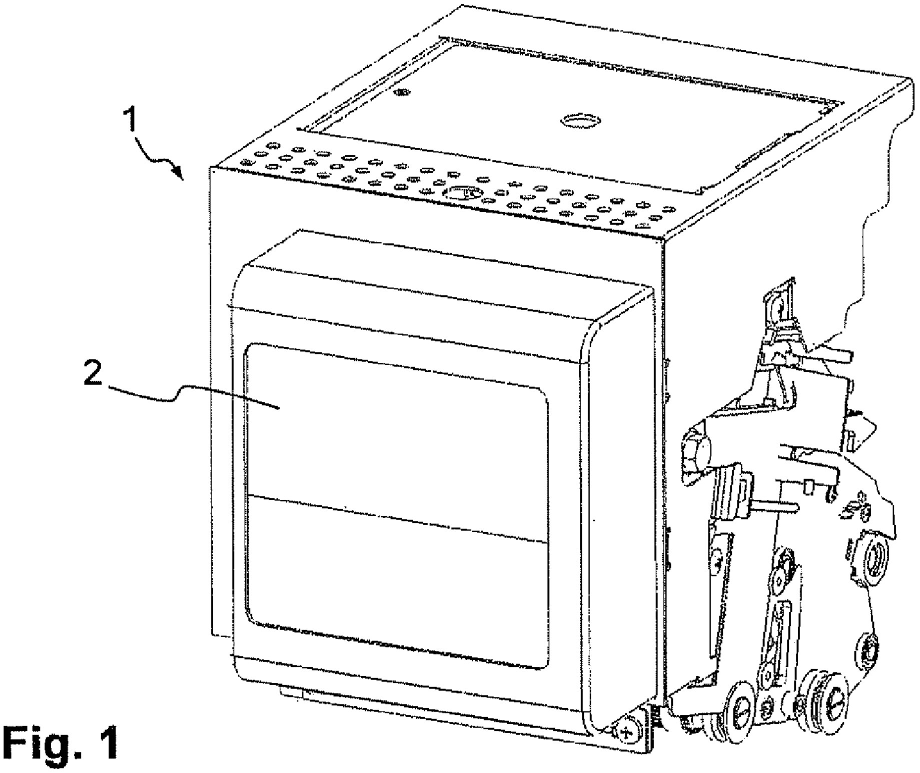
FIGS. 1 to 12 show one embodiment of an apparatus according to the invention for accepting and dispensing or returning bank notes at different points in time while accepting and dispensing or returning bank notes.

In FIG. 1 an embodiment of an apparatus 1 for accepting and dispensing or returning bank notes is shown, with a pocket for accepting and dispensing or returning bank notes that is closed by a faceplate or a shield 2.

Figure 2:
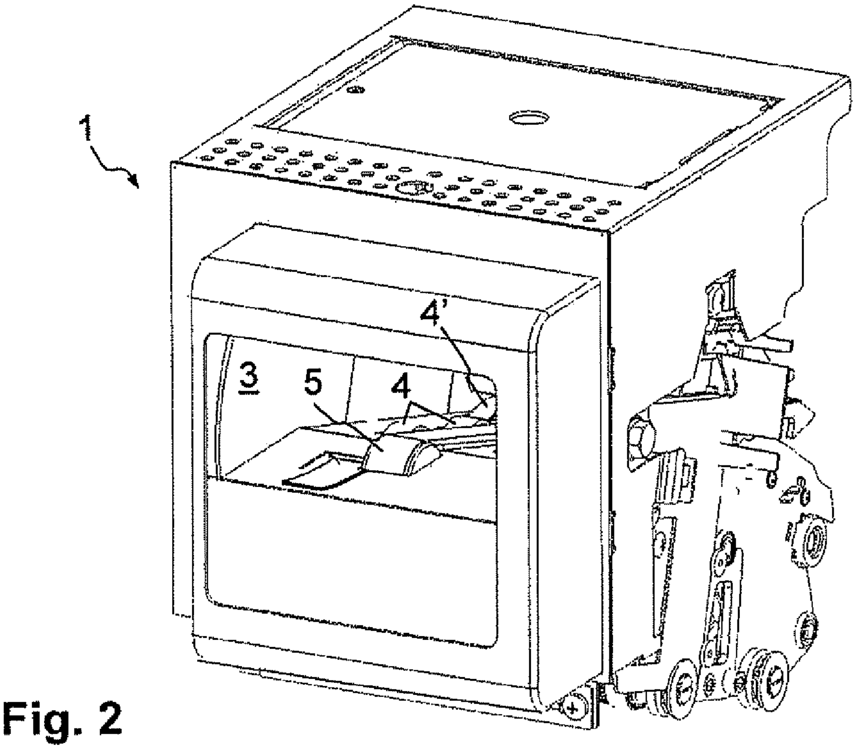

FIG. 2 shows the embodiment represented in FIG. 1 of the apparatus 1 for accepting and dispensing or returning bank notes, after the faceplate 2 was opened for inputting bank notes and reveals the pocket 3 for accepting and dispensing or returning bank notes. Furthermore, when the faceplate 2 is open, components 4, 4' of a singling device for singling bank notes are visible. The components 4, 4' of the singling device concern feed rollers 4, which, during the singling procedure, transport the respectively bottommost of the bank notes input in the pocket 3 to an also shown singling roller 4'. Additionally a clamping and transport element 5 is shown, whose function is described in greater detail in the following.

To facilitate comprehension in the FIGS. 3 to 12 described below the faceplate 2 and the components of the apparatus 1 for accepting and dispensing or returning bank notes accommodating the faceplate 2 are not shown.

Figure 3:
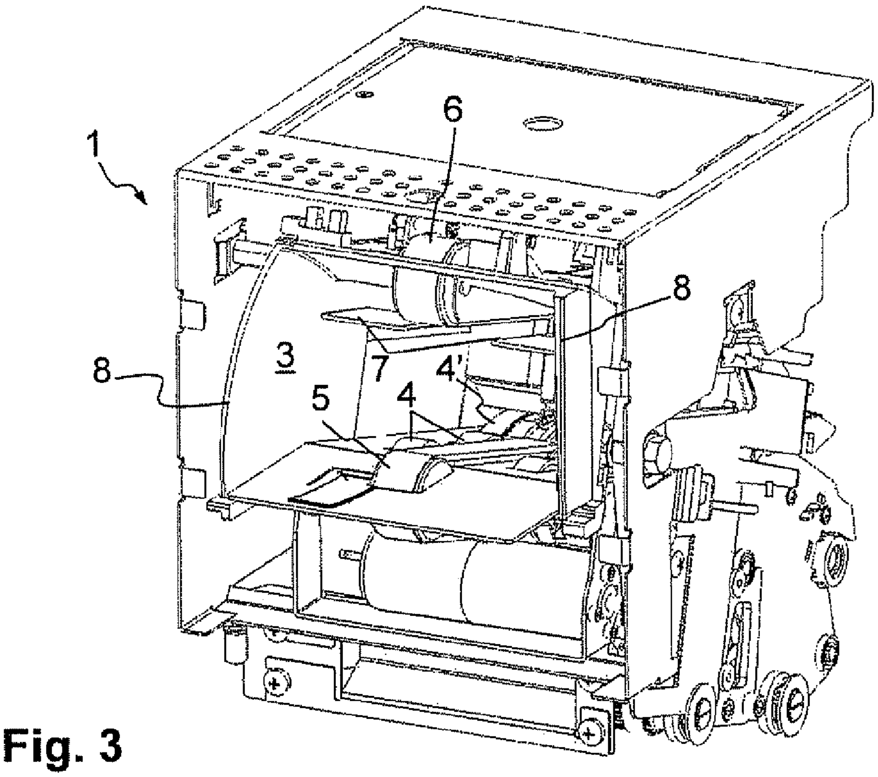

Also FIG. 3 shows the apparatus 1 for accepting and dispensing or returning bank notes, after the faceplate 2 was opened for the purpose of inputting bank notes. In addition to the elements inside the pocket 3 visible in FIG. 2, a dividing element 7 is visible, having a gap in the shown embodiment, in which a further clamping and transport element 6 engages. The dividing element 7 and the further clamping and transport element 6 are in their initial position. It may also be provided that the dividing element 7 does not have a gap. In this case the clamping and transport elements 5, 6 at most reach up to the front edge of the dividing element 7 from the perspective of the input opening. The dimensioning of a distance between the dividing element 7 and the clamping and transport elements 5, 6 essentially depends on a maximum amount of bank notes to be dispensed or returned, i.e. the thickness of the stack formed by these bank notes.

Figure 4:
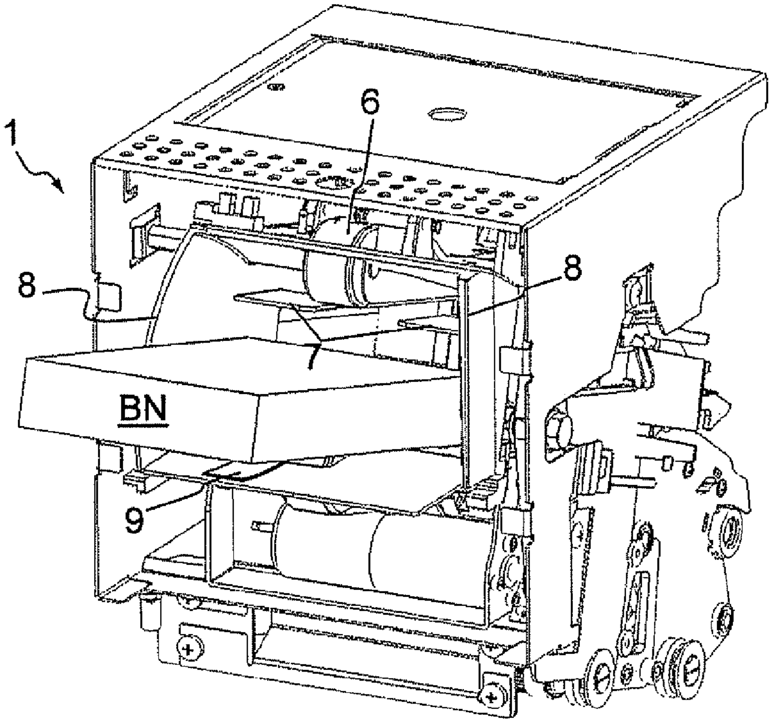

FIG. 4 shows the apparatus 1 for accepting and dispensing or returning bank notes after bank notes BN have been input by an operator in the pocket 3 limited by side walls 8. Through the dimensioning of the (not shown) faceplate 2 and of the components accommodating it is achieved that the bank notes BN cannot be input by the operator so that they reach the end of the pocket 3, i.e. the singling roller 4'. On the other hand, the bank notes BN can be input in the pocket 3 to such an extent that, after the operator lets go of them, they are safely accommodated in the pocket 3 and do not drop out. The dimensioning of the pocket 3, the faceplate 2 and of the components accommodating the faceplate 2 depends on the size of the bank notes to be input and should allow that the bank notes can be input in the pocket 3 up to more than half of the measured length of the long side of the largest bank note. Alternatively it can be provided that when the bank notes BN are input in the pocket 3 a sensor 9, e.g. a light barrier, detects the input of the bank notes BN, whereupon the clamping and transport element 5, 6, as described below, takes over the bank notes BN inside the pocket. It is thus achieved that the bank notes BN cannot be input by the operator up to the singling roller 4'.

Figure 5:
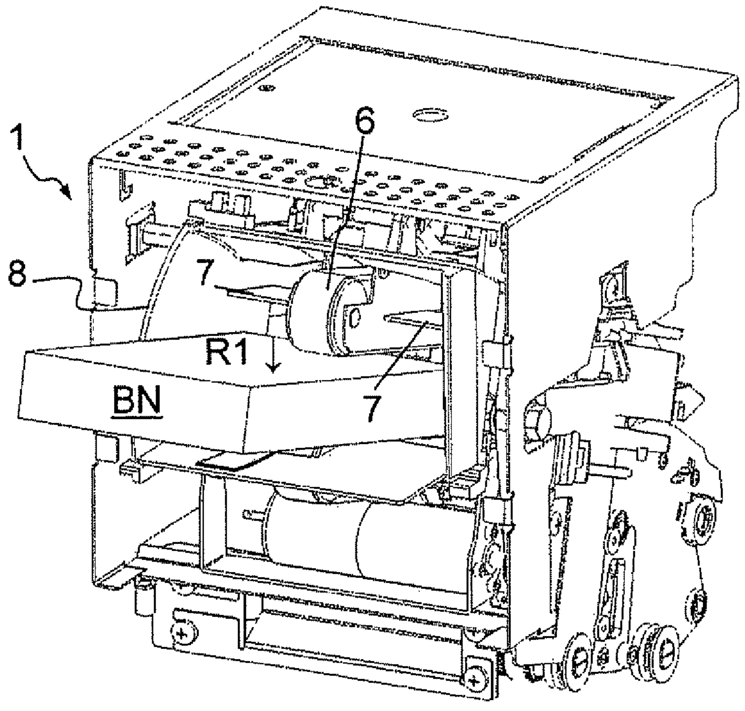

As shown in FIG. 5 the further clamping and transport element 6 is displaced by means of a parallel drive in a first direction R1 in the plane of the bank notes BN, until the bank notes BN are clamped between the clamping and transport element 5 (not visible in FIG. 5) and the further clamping and transport element 6. On the basis of the position of the further clamping and transport element 6 a first estimate can be made of how many bank notes BN were input, i.e. the number of bank notes BN to be accepted can be determined approximately. It is thus also possible to determine whether the maximum admissible amount of bank notes was exceeded, e.g. the input of more than 100 bank notes. In this case the acceptance procedure can be terminated and the operator can be requested to remove the bank notes BN and to input a smaller amount of bank notes.

Figure 6:
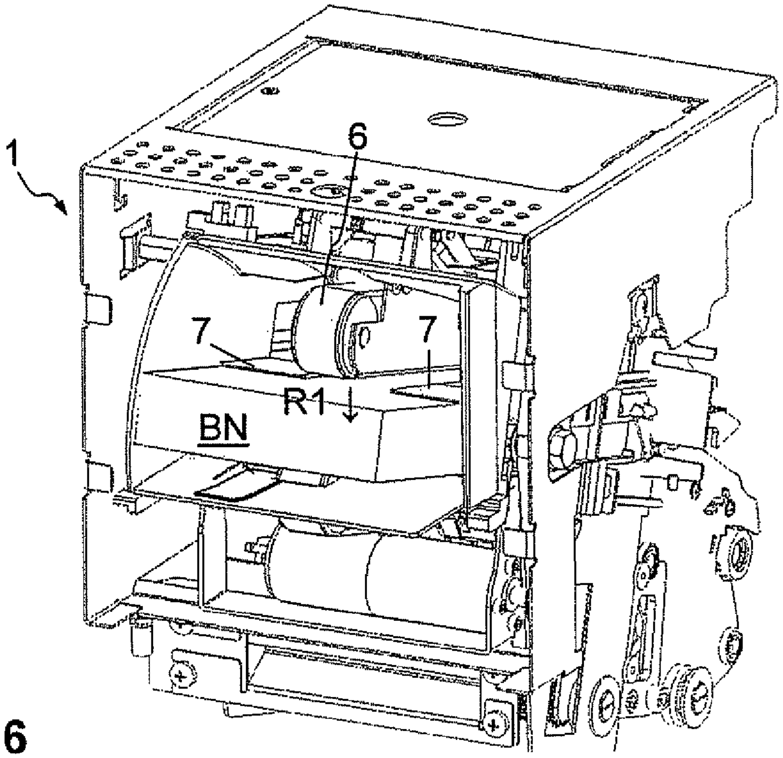

As shown in FIG. 6 the bank notes BN clamped between the clamping and transport elements 5, 6 are transported by the clamping and transport elements 5, 6, into the pocket 3. Expediently both transport elements 5, 6 are actuated therein, however, it is also possible to actuate only one of the transport elements 5 or 6. For this transport of the bank notes BN into the pocket 3 alternatively or additionally also the feed rollers 4 can be used. Likewise the transport element 5 can be used alternatively or in addition to the feed rollers 4, to feed bank notes BN to the singling roller 4' during the singling procedure. The bank notes BN are transported fully into the pocket 3, so that the faceplate 2 (not shown in FIG. 6) can be closed. After closing the faceplate 2 the dividing element 7 is moved in the first direction R1 into the plane of the bank notes BN, e.g. until the dividing element 7 rests on top of the bank notes BN, in order to divide the pocket into two areas for accepting and dispensing or returning.

Figure 7:
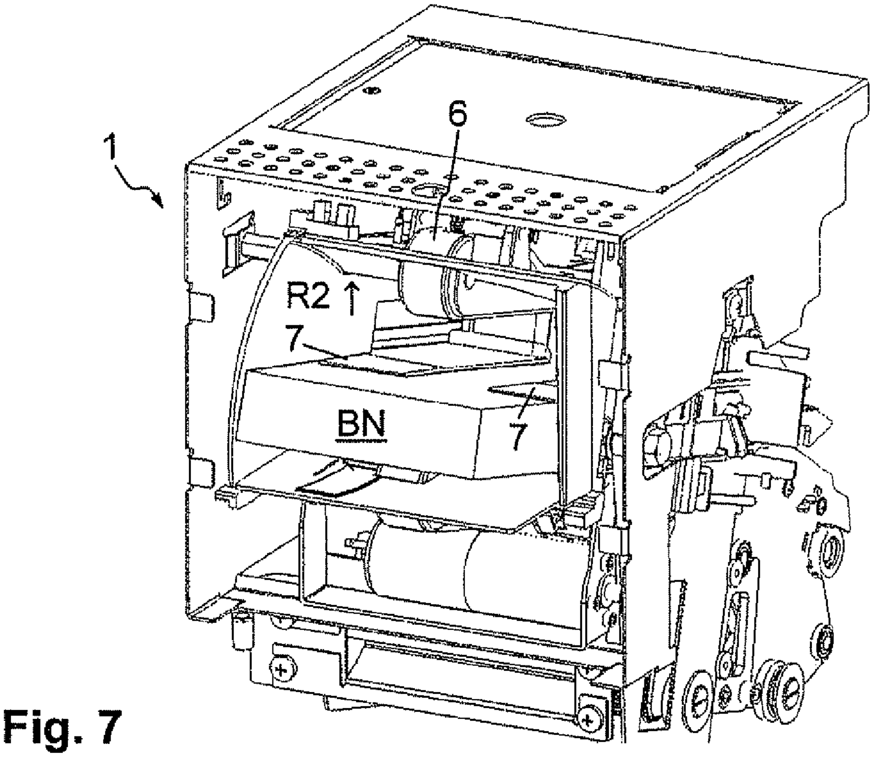

Afterwards, as shown in FIG. 7, the further clamping and transport element 6 is moved away from the bank notes BN in a second direction R2 that is contrary to the first direction R1. Therein the further clamping and transport element 6 is moved back to its initial position, which it occupied at the time shown in FIG. 3.

Subsequently the input bank notes BN are processed, i.e. they are accepted. For this purpose the apparatus 1 for accepting and dispensing or returning bank notes is connected to a bank note processing device. The bank note processing device can for example have a transport system, a sensor device, a repository for bank notes, e.g. one or several cassettes for different types of bank notes, an intermediate repository for storing bank notes during processing, etc.

After inputting the bank notes BN in the pocket 3 or after they were drawn in by the clamping and transport elements 5, 6, the faceplate 2 was closed, as described above. The closing process of the faceplate 2 can be triggered by a command input by the operator, e.g. by means of a keyboard, or by the monitoring of the pocket 3 for the presence of bank notes or their complete intake, e.g. by means of one or several light barriers. During the processing of the bank notes the faceplate 2 remains closed and is locked so that it cannot be opened, in order to prevent unauthorized interventions or manipulations. By means of the feed rollers 4 the respectively bottommost of the bank notes BN is fed to the singling roller 4', which collects single bank notes from the input stack of bank notes BN and transfers them to the transport system of the bank note processing device, The dividing element 7 can press against the bank notes BN during the singling of the bank notes BN, so that these can be collected securely by the singling roller 4' or the feed rollers 4. During the continuous singling of the bank notes BN the dividing element 7 can be continuously moved in the direction R1, in order to effect the desired support of the singling procedure. For this purpose the position of the dividing element 7 is adjusted to the reduction in height of the stack of bank notes BN in the course of the singling. To prevent a wedging or jamming of the dividing element 7 the dividing element 7 is preferably guided by means of a linear guide. However, in the case that no support of the singling is required, the dividing element 7 can also remain in a certain position within the pocket 3, in order to effect the division of the pocket 3 into the two areas for accepting and returning or dispensing bank notes.

The transport system transports the singled bank notes through the sensor device. The sensor device has one or several sensors, e.g. optical, mechanic or acoustic sensors, which check the bank note respectively transported past. This checking can for example encompass determining the authenticity of the bank note, the type of bank note, i.e. in particular the currency and denomination, the state of the bank note, the dimensions of the bank note, etc. After the checking the bank notes transported by the transport system are transported on to the repository and deposited there in dependence of the checking result of the sensor device, e.g. in a certain cassette corresponding to the determined type of bank note. Deviating therefrom the bank notes can also be deposited in the intermediate repository during processing. In the intermediate repository the bank notes are kept until all bank notes have been processed. The distribution of the bank notes from the intermediate repository e.g. to the various cassettes in accordance with the determined type of bank note is carried out subsequently, for example after the operator has confirmed the correct acceptance of the bank notes.

Figure 8:
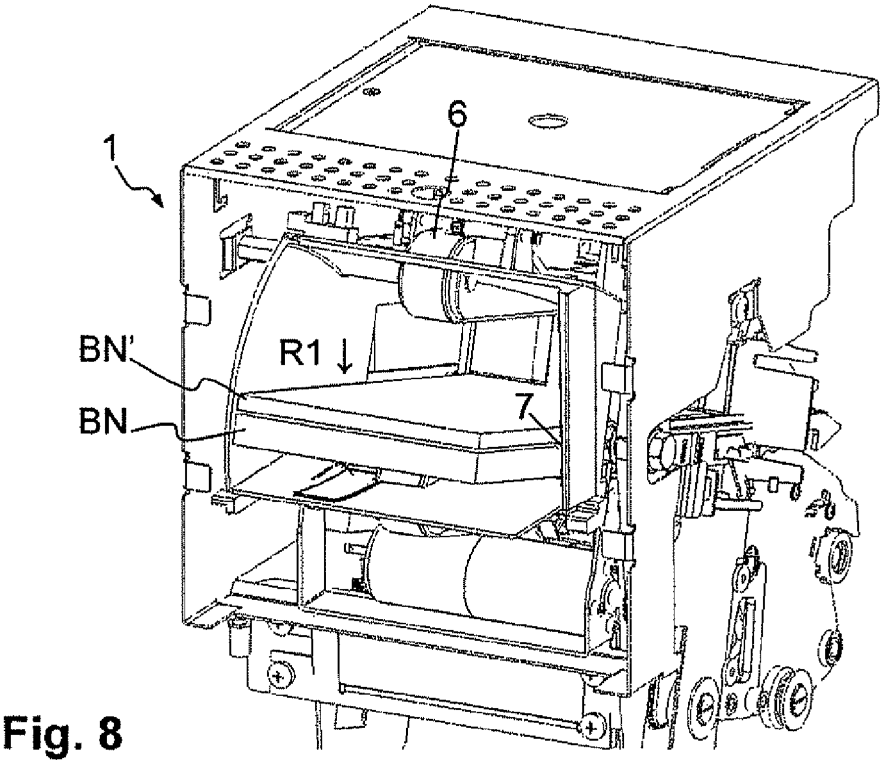

As shown in FIG. 8 non-processable bank notes, i.e. bank notes that are not recognized by the sensor device or bank notes which trigger a malfunction, e.g. when two or several bank notes are collected at one time, are transported back to the pocket 3 by the transport system to be returned to the operator. The bank notes to be returned BN' are transported into the pocket 3 by the transport system, below the clamping and transport element 6 that is disposed in its initial position, and are separated from the bank notes BN still to be processed by the dividing element 7, on which the bank notes BN' to be returned are collected successively.

Figure 9:
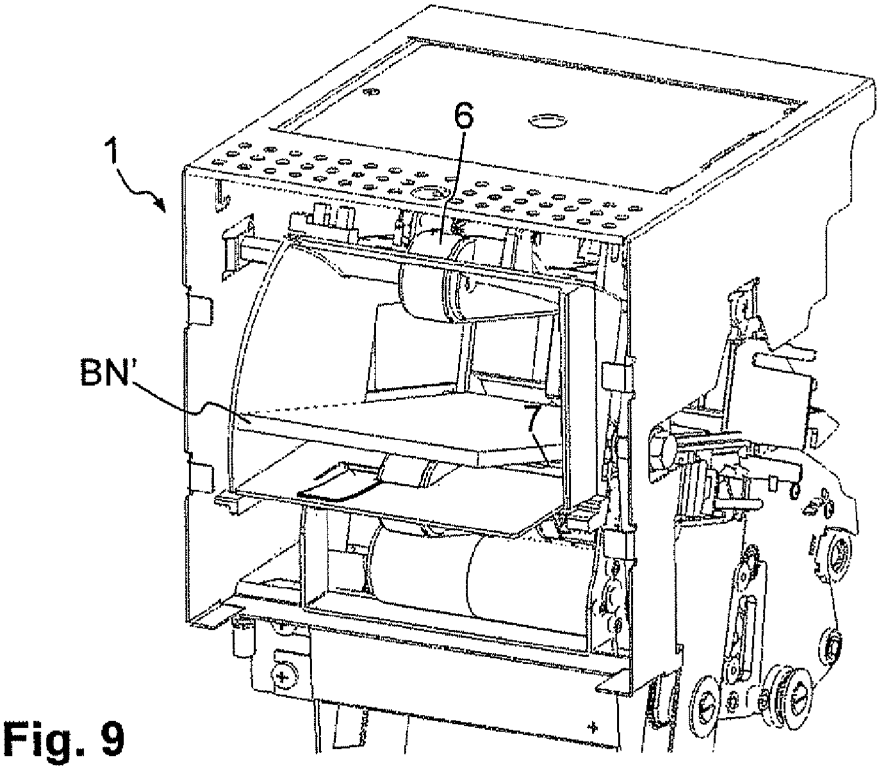

After the singling and processing of all bank notes BN input in the pocket 3 the bank notes BN' to be returned rest on the dividing element 7 in the pocket 3, as shown in FIG. 9.

Figure 10:
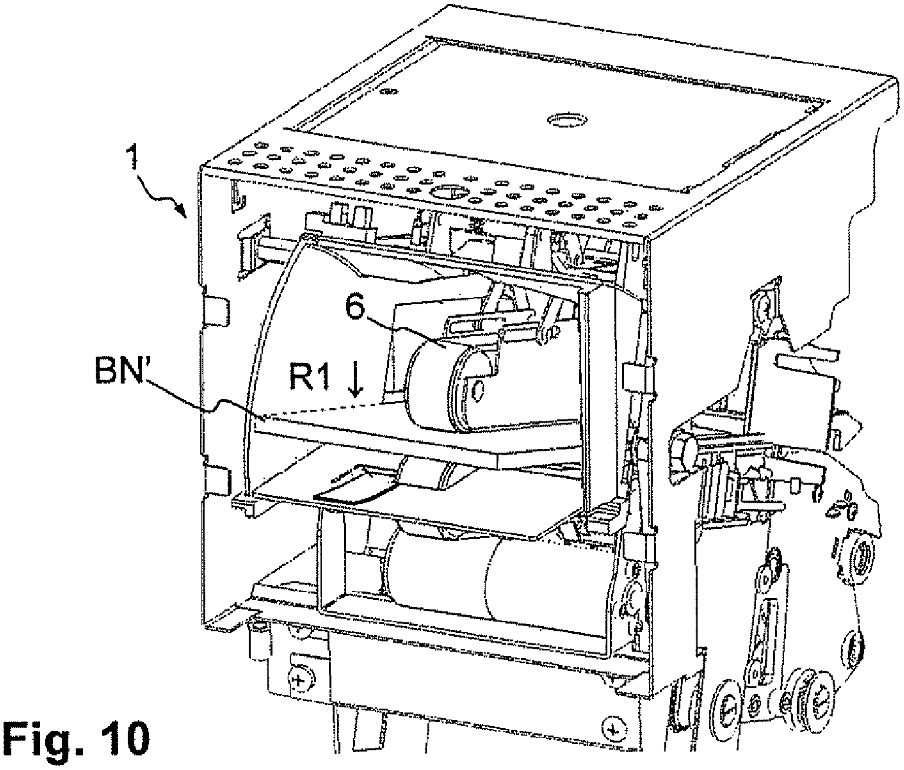

FIG. 10 shows that the further clamping and transport element 6 is displaced in a first direction R1 into the plane of the bank notes to be returned BN', to clamp the bank notes to be returned BN' between the clamping and transport element 5 (not visible in FIG. 10) and the further clamping and transport element 6, and to transport them partly out of the pocket 3 after the faceplate 2 (not shown in FIG. 10) was opened. Therein the bank notes to be returned BN' are removed also from the area of the dividing element 7.

Figure 11:
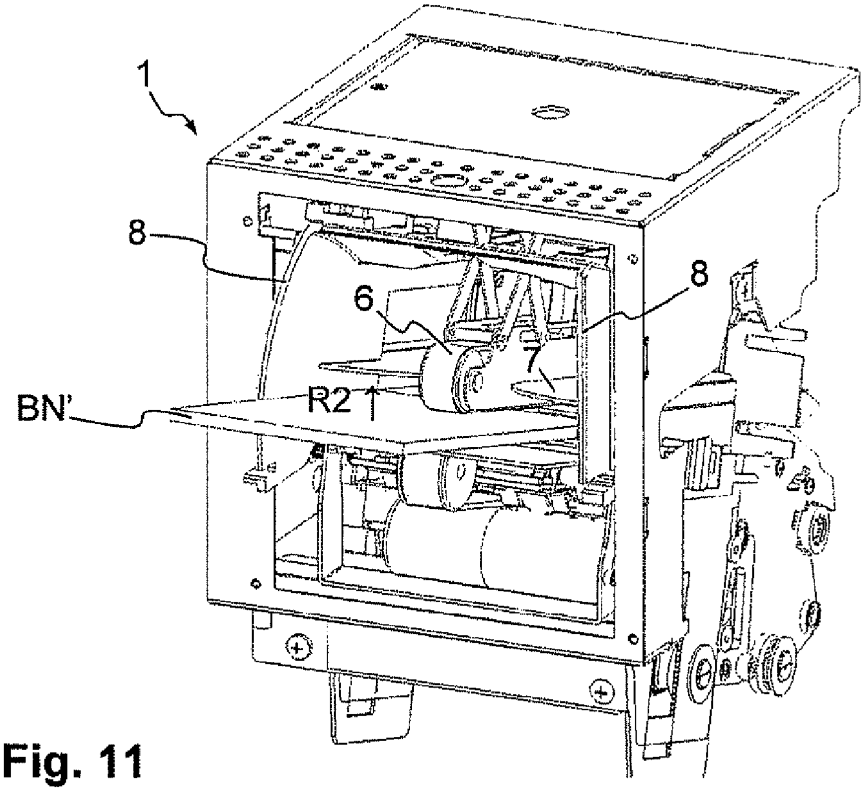

Afterwards, as shown in FIG. 11, the dividing element 7 is moved in the second direction R2 until it has reached its initial position shown in FIG. 3. Since the bank notes to be returned BN' were removed from the area of the dividing element 7 by the clamping and transport elements 5, 6, the movement of the dividing element 7 to its initial position is possible without interference by the bank notes to be removed BN' or the clamping and transport element 6.

Alternatively it can be provided that the dividing element 7 and the bank notes to be returned BN' overlap slightly after the bank notes to be returned BN' were transported partly out of the pocket 3 by the clamping and transport elements 5, 6. During the movement of the dividing element in the second direction R2 the bank notes BN slightly overlapping in the end area of the dividing element 7 are deformed and give way to the dividing element 7, so that the dividing element 7 can be moved to its initial position.

Alternatively or additionally it can be provided that at least the end portion of the dividing element 7 is made of a flexible material, e.g. dimensionally stable rubber. It is thus rendered possible that during the movement in the second direction R2 the dividing element 7 is reversibly deformed in the contrary first direction R1, in order to enable the movement of the dividing element 7 in the second direction R2, past the bank notes to be returned BN'. Alternatively, also the complete dividing element 7 can consist of a flexible material.

As a further alternative or further addition it can be provided that the end portion of the dividing element 7 is foldable at least in the first direction R1. For this purpose the end portion of the dividing element 7 can be connected to the rest of the dividing element 7 by means of a hinge pretensioned by a spring, enabling an evasive movement of the end portion of the dividing element 7 in the first direction R1 past the bank notes to be returned BN' and the further clamping and transport element 6. After the end portion of the dividing element 7 was moved past the bank notes to be returned BN', the pretension by the spring makes the end portion of the dividing element 7 fold backwards.

Since the faceplate 2 was already opened the bank notes to be returned BN' clamped between the clamping and transport elements 5, 6 can be grasped and completely removed from the pocket 3 by the operator. The clamping force exercised by the clamping and transport elements 5, 6 is generally adjusted in such a manner that the bank notes to be returned BN' can be transported securely, but can also be removed by the operator without any problem. Subsequently, also the further clamping and transport element 6 is returned to its initial position shown in FIG. 3. As described above in connection with the transport of the bank notes BN into the pocket 3, it is expedient also for the case of the transport of the bank notes to be returned BN' to actuate both transport elements 5, 6. Additionally or alternatively the feed rollers 4 can be used also in this case.

Deviating from the above description of the dispensing or returning procedure of bank notes BN', in which the dividing element 7 was moved to its initial position while the faceplate 2 was opened, it is also possible to provide a changed sequence, in which the faceplate 2 is closed. In this case the pocket 3 must be dimensioned in such a manner that the bank notes to be returned BN' can be transported out of the area of the dividing element 7 by the clamping and transport elements 5, 6. In this case the faceplate 2 is opened after the dividing element 7 was returned to its initial position. Subsequently the bank notes to be returned BN' can be transported out of the pocket 3 by the clamping and transport elements 5, 6, so that the operator can remove them. In addition to an enlargement of the pocket 3 it can also be provided that the bank notes are transported by the clamping and transport elements 5, 6 against the closed faceplate 2. In this case the bank notes are deformed, e.g. by bending them into the free space of the pocket 3, and, as described above, thus allow to be removed from the area of the dividing element 7 so that the latter can be brought to its initial position. The faceplate 2 is opened subsequently, so that the operator can remove the bank notes.

Figure 12:
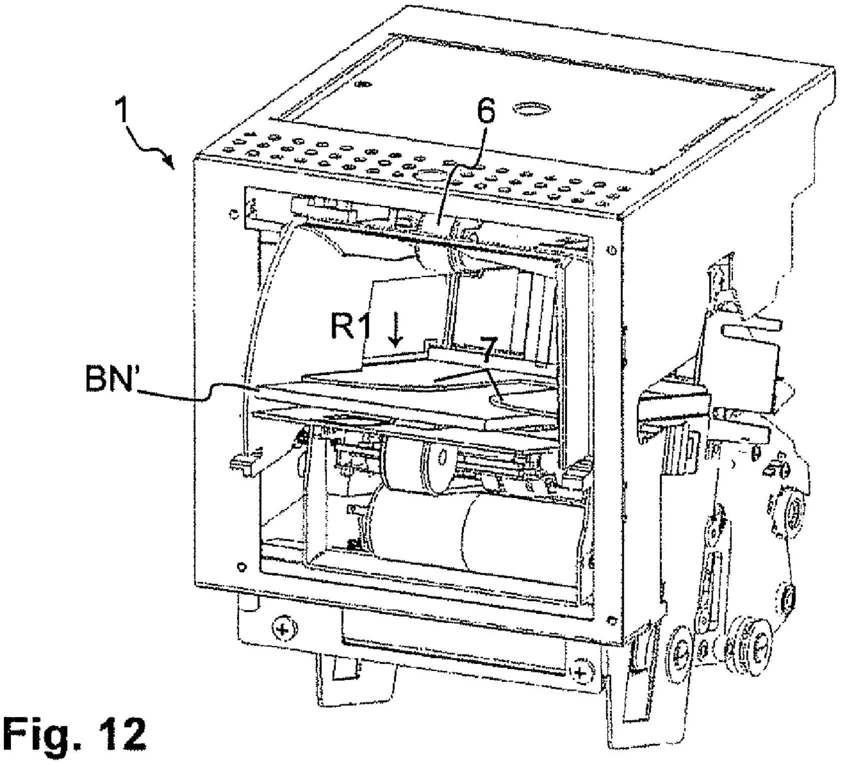

For the case that the operator forgets to remove the bank notes to be returned BN' from the pocket 3, e.g. 20 seconds after they were presented to the operator, the bank notes to be returned BN' are transported back into the pocket 3 by the clamping and transport elements 5, 6 and the faceplate 2 is closed. As shown in FIG. 12 the dividing element 7 can be lowered onto the bank notes to be returned BN' in the first direction R1 (FIG. 12). The further clamping and transport element 6 is subsequently moved in the second direction R2 and brought to its initial position shown in FIG. 3. Subsequently the bank notes to be returned BN' are singled and kept in the bank note processing device connected to the apparatus 1 for accepting and dispensing or returning bank notes; e.g. in one of the cassettes described above or in a special container for forgotten bank notes.

So far a procedure was described in which the acceptance of bank notes BN is carried through completely, and in which possibly non-processable bank notes BN' are returned. However, it is obvious that such a procedure for accepting bank notes BN can also be aborted prematurely. In this case all bank notes disposed in the pocket 3 are returned. If for example the situation displayed in FIG. 8 is assumed, the not yet processed bank notes BN underneath the dividing element 7 and the bank notes to be returned BN' on top of the dividing element 7 are returned. For this purpose the clamping and transport element 6 is moved in the first direction R1, until the bank notes BN, BN' are clamped. Subsequently the bank notes BN, BN are transported out of the area of the dividing element 7 and the dividing element 7 is moved in the second direction R2 to its initial position. As described above the faceplate 2 therein can be opened before or after the transport of the bank notes BN, BN' out of the area of the dividing element 7. It can possibly also be provided that all originally input bank notes BN are returned upon an abortion of the acceptance procedure. In this case the bank notes BN which are already disposed in the intermediate repository of the bank note processing device connected to the apparatus 1 for accepting and dispensing or returning bank notes are transported back into the pocket 3 and placed on top of the bank notes BN' to be returned. Subsequently all bank notes are returned like in the case of the abortion of the acceptance of bank notes described above with reference to FIG. 8.

Instead of the embodiment shown and described so far, in which the bank notes are transported parallel to their long edges, it is of course also possible to transport them parallel to their short edges. In this case of course all components of the apparatus 1 for accepting and dispensing or returning bank notes have to be dimensioned accordingly.

So far the apparatus 1 for accepting and dispensing or returning bank notes was described only in connection with accepting bank notes and returning bank notes which fail to be accepted during the acceptance procedure. In the dispensing or paying out of bank notes not described in detail e.g. such bank notes can be dispensed which are deposited in a (not shown) cassette of the repository of the bank note processing device connected to the apparatus 1 for accepting and dispensing or returning bank notes, which cassette is suitable for dispensing.

In the case that the apparatus 1 is used for dispensing bank notes, the bank notes to be dispensed are deposited on the bottom of the pocket 3. For this purpose the clamping and transport element 5, 6 is brought to its initial position shown in FIG. 3. The dividing element 7 can also be brought to its initial position. However, it is also possible that the bank notes to be dispensed are placed on the dividing element 7. The bank notes to be dispensed are subsequently clamped by the clamping and transport device 5, 6 and transported out of the pocket 3, so that they can be grasped and removed by the operator.

Furthermore in addition to bank notes to be accepted or to be dispensed also checks, vouchers or other documents of value can be contained. These are processed together with the bank notes and are for example kept in a special cassette of the repository of the bank note processing device connected to the apparatus 1 for accepting and dispensing or returning bank notes.

In the event that disturbances occur during the singling of bank notes BN by means of the singling device 4, 4', the clamping and transport element 5, 6 can also be used to eliminate these disturbances. In particular bank notes which are wedged in the gap of the singling roller 4' can be pulled out by means of the clamping and transport element 5, 6, provided that the wedged bank note still protrudes into the pocket 3 far enough that it can be collected by the clamping and transport element 5, 6. The wedged bank note and possibly further bank notes still disposed in the pocket 3 are then transported in the direction of the faceplate 2 and the wedged bank note is freed during the transport into the pocket 3. The further bank notes disposed in the pocket 3 can abut on the faceplate 2 during this procedure, whereby they are deformed. After freeing the wedged bank note the transport direction of the clamping and transport element 5, 6 is reversed and the further bank notes are transported back to their original position. Alternatively or additionally also the clamping and transport element 6 can be moved in the second direction R2, so that the deformed further bank notes return to their original position due to the deformation.

In the event that more considerable disturbances occur, the clamping and transport element 6 and/or the dividing element 7 can be brought to their initial position, so that the space of the pocket 3 is completely open and offers the operator or a service person access to the singling roller 4'.

Concerning the design of the dividing element 7 several variants are thinkable; in particular the dividing element can consist of one part or of two separate parts. In the case that the dividing element 7 consists of one part, this one part can have a gap in which engages the clamping and transport element 6 as described above. However, the dividing element 7 can also consist of two parts which are movably mounted on opposite side walls 8 of the pocket 3 in such a manner that the clamping and transport element 6 is disposed between the two parts. Upon a movement of the dividing element 7 in the two directions R1 or R2 both parts of the dividing element 7 are moved simultaneously and at the same speed, so that they are always at the same height and facing each other.

The invention claimed is:

1. An apparatus for accepting and dispensing or returning bank notes, comprising a pocket which, for inputting and dispensing or returning bank notes, is dividable into two areas by means of a dividing element, wherein the dividing element is movable within the pocket in order to form the two areas, and a clamping and transport element movable within the pocket independently from the dividing element to enable clamping of bank notes disposed in the pocket inside the pocket and transporting said bank notes, wherein, for clamping bank notes, the clamping and transport element is movable in a first direction within the pocket on top of bank notes disposed in the pocket and is arranged to transport bank notes to be dispensed or returned out of the area of the dividing element at least for the most part, and the dividing element is subsequently movable out of the area of the bank notes disposed in the pocket within the pocket past the clamping and transport element in a second direction that is opposite to the first direction.

2. The apparatus according to claim 1, wherein the dividing element has an end portion which is foldable at least in the first direction.

3. The apparatus according to claim 1, wherein the dividing element has at least a flexible end portion which is deformable reversibly at least in the first direction.

4. The apparatus according to claim 1, wherein the dividing element is formed as one part to define a single-part dividing element.

5. The apparatus according to claim 4, wherein the single-part dividing element has a gap in which the clamping and transport element engage.

6. The apparatus according to claim 1, wherein the dividing element is formed as two parts which are movably mounted on two opposite side walls of the pocket, and that the clamping and transport element is arranged between the two parts of the dividing element.

7. The apparatus according to claim 1, wherein the clamping and transport element is arranged to transport the bank notes in a direction pointing out of the pocket to eliminate disturbances.

* * * * *